(Model.)
J. F. SCHLOSSSTEIN & J. WARNINGER.
HORSESHOE.
No. 247,275.        Patented Sept. 20, 1881.
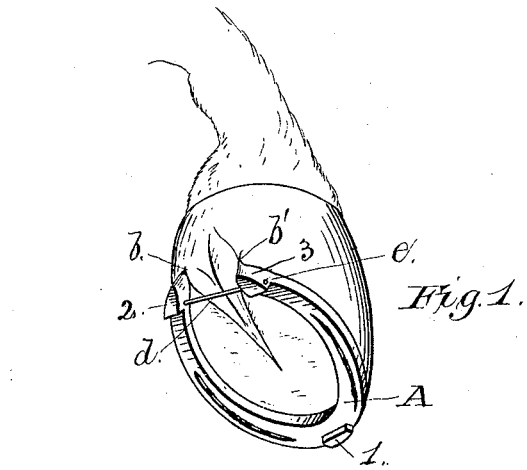
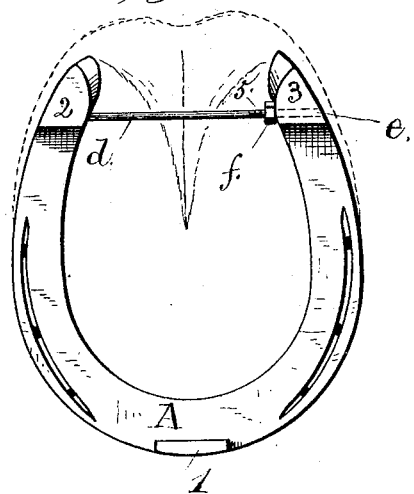
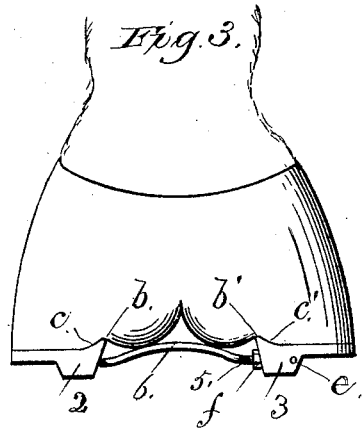
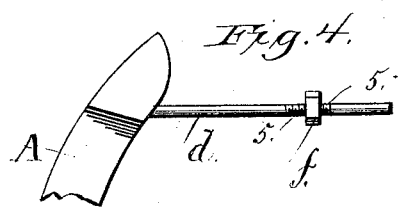
Witnesses.
Franck L. Ouraud
D. P. Cowl
Inventors.
John F. Schlossstein
Jacob Warninger
by John J. Halsted.
their Atty
N. PETERS. Photo-Lithographer. Washington, D. C.

UNITED STATES PATENT OFFICE.

JOHN F. SCHLOSSSTEIN, OF BUFFALO, AND JACOB WARNINGER, OF ALMA, WISCONSIN.

HORSESHOE.

SPECIFICATION forming part of Letters Patent No. 247,275, dated September 20, 1881.

Application filed April 23, 1881. (Model.)

*To all whom it may concern:*

Be it known that we, JOHN F. SCHLOSSSTEIN, of Buffalo city, and JACOB WARNINGER, of Alma, both in the county of Buffalo and State of Wisconsin, have invented certain new and useful Improvements in Horseshoes for Hoof-Bound or Contracted Hoofs; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Many contrivances have been devised in connection with horseshoes for horses and other animals having hoof-bound or contracted hoofs; but most of these are complicated or too expensive, or liable to get out of order.

The object of our present invention is to avoid these and other objections and yet produce a shoe without hinge or joint, the body of which need vary but little from the common form of shoe, and which will hold the crust of the hoof firm and prevent further contraction, while permitting and causing its easy and gradual expansion, and without taking the horse from his accustomed labor.

It consists in a specific construction of the heel part of the shoe, combined with a rod or bar fixed to one heel and projecting into the other heel, and a nut on a threaded part of such rod or bar between the heels, all as will now be more particularly described.

In the drawings, Figure 1 is a perspective view of our improved horseshoe applied to a hoof; Fig. 2, an under-side view enlarged; Fig. 3, a rear view, showing a modified form; and Fig. 4 a fragmentary view.

The shoe A, as will be seen, may in the main be of the usual form, and may have the usual toe and heel calks, 1 2 3. At about the extremity of the heels are tongues or projections $b$ $b'$, one on each heel respectively, rising upward from their inner side, the outer faces of these projections being inclined or tapering upward and inward, as seen at $c$ $c'$, and adapted to fit against the inner side or face of the rearmost part of the crust, and the projections lodging between it and the rearmost part of the frog. Thus made and applied these projections are not driven into the hoof at all, which would be injurious; but, upon the contrary, under the pressure of the horse's weight the inner edge of the crust merely bears upon such incline, preventing any further contraction of the hoof, and giving a constant tendency to its easy expansion.

In order to take advantage of any expansion or disposition to expand, we secure permanently in one of the shoe-heels—say in 2—a cross rod or bar, $d$, which is long enough to extend into or through an unthreaded hole, $e$, in the other heel, 3. This bar or rod is threaded between its ends for a short distance, as shown at 5, to receive an adjusting-nut, $f$, which is placed on the rod before the latter is fastened to place, and the position of this nut is therefore on the inside of the shoe—that is, between the two heels—so that by no possibility can it ever work off or be lost, and it cannot, therefore, interfere with the horse's other foot or cut or scratch him in any way, nor be in the way of any other horse when driving double. The rod or bar need not project beyond the outside face or surface of the shoe.

It will be evident that the rod or bar may be flat, as shown in Fig. 3, instead of round, except for that small part requiring to be threaded to receive the nut; and it may be welded or in any other way fixed to one of the extremities of the shoe, the thread being cut and the nut put on before the bar is welded or fastened to its place, as stated; or the bar may be secured to the shoe by first punching a hole partly through the shoe, and when the latter is red hot inserting one end of the cold bar or rod in such hole. The contraction by cooling will hold it tight enough, and should it get a little loose it is of no consequence, because it cannot escape, and the nut can always perform its proper duty. With the flat bar the shoe makes a perfect bar-shoe. The round bar is preferred to the flat one, and the holding by punching a hole and inserting the rod therein is preferred to fastening by welding. The bar may be bent upward a little between the heels, so that the frog may rest upon it, as shown at 6 in Fig. 3.

It will be observed that the tongues $b$ $b'$ are so located as to be harmless, and that they do not and cannot press or bear upon the softer part of the foot or hoof, so as to be liable to cause corns to grow; and as they do not need to be driven into the hoof in order to fit the shoe to place, they do not in any way weaken or crack or indent the hoof, or tend to aggravate any existing ailment of the foot.

This device avoids the need of driving nails too close to the heel, and which should never be done on a hoof-bound horse or mule, for the crust is there very thin and tender; and if nails be driven too close to the heel, the hoof is still more apt to dry out, and this would cause it to contract still more, and, besides, when the shoe is screwed apart or spread apart, the nails would not hold it, and they would tear out or split the hoof; but by having no nails near the heel, as will be seen by reference to the drawings, and the projections or tongues made and located as shown, these latter hold the crust firm when the shoe is spread or screwed apart, and as the incline of the tongues is upward toward the inside, to accord with the crust of the hoof at that portion, it follows that at every step the animal takes the crust is forced out slightly, and this affords an opportunity to screw it apart by means of the nut every few days, and as these tongues hold it firmly the hoof will gradually but surely grow outward, as it ought.

It is a common practice in the effort to cure contracted hoofs to pare down the heel and let the animal walk on the frog, and turn it out into marshy grounds for months, thus losing its services; but with our improved shoe the needful heel is not cut away, but remains, and the animal is able to work every day.

We are aware that screws of various kinds have been used for horseshoes for hoof-bound horses; but we are not aware of any shoe having the construction, peculiarities, and advantages of our invention, as above described.

We claim—

The improved horseshoe described, as made with the inclined tongues $b$ $b'$ at the extremities of the heels, and with the rod or bar unthreaded at its ends, but having a short thread near its unsecured end, said bar or rod being permanently fixed in or on one heel and projecting into or through the other heel, and having an adjusting-nut on such threaded part, all as and for the purposes set forth.

JOHN F. SCHLOSSSTEIN.
JACOB WARNINGER.

Witnesses:
TOBIAS VALEAR,
MILTON VAN DYKE.